US007635416B1

(12) United States Patent
Hansen et al.

(10) Patent No.: US 7,635,416 B1

(45) Date of Patent: Dec. 22, 2009

(54) THREE-DIMENSIONAL RECONFIGURABLE WALL ADORNMENT SYSTEM

(75) Inventors: Colleen Hansen, West Valley, UT (US); Erik J. Higley, Bountiful, UT (US)

(73) Assignee: Beyond Borders, LLC, Bountiful, UT (US)

(*) Notice: Subject to any disclaimer, the term of this patent is extended or adjusted under 35 U.S.C. 154(b) by 160 days.

(21) Appl. No.: 12/029,460

(22) Filed: Feb. 11, 2008

Related U.S. Application Data

(62) Division of application No. 10/361,472, filed on Feb. 10, 2003, now abandoned.

(60) Provisional application No. 60/361,452, filed on Mar. 4, 2002.

(51) Int. Cl.

| | |
|---|---|
| ***E04F 13/072*** | (2006.01) |
| ***B32B 37/10*** | (2006.01) |
| ***B32B 37/12*** | (2006.01) |
| ***B32B 37/28*** | (2006.01) |

(52) U.S. Cl. ........................................ 156/71; 156/293

(58) Field of Classification Search .................. 156/61, 156/63, 71, 250, 268, 290, 291, 293, 295; 428/15–19, 98, 158, 160, 317.1, 317.3
See application file for complete search history.

(56) References Cited

U.S. PATENT DOCUMENTS 5,402,583 A * 4/1995 Komura ....................... 33/758
5,491,006 A * 2/1996 Johnson et al. ............... 428/13
5,672,391 A * 9/1997 Santarossa .................. 427/356
5,915,754 A * 6/1999 Hiller et al. .................. 29/839
6,132,821 A * 10/2000 Garr ............................ 428/15
6,206,991 B1 * 3/2001 Starr ........................... 156/71
6,296,913 B1 * 10/2001 D'Andrade ................ 428/40.1
6,481,170 B1 * 11/2002 Savenok et al. ............ 52/288.1
6,627,284 B1 * 9/2003 Naidj ........................ 428/40.1
2007/0107342 A1 * 5/2007 Friedlich .................. 52/311.1

FOREIGN PATENT DOCUMENTS

JP 03039012 A * 2/1991
JP 03188971 A * 8/1991
JP 08291055 A * 11/1996

OTHER PUBLICATIONS

English abstract for JP 08-291055.*
English abstract for JP 03-039012.*
English abstract for JP 03-188971.*

* cited by examiner

*Primary Examiner*—Philip C Tucker
*Assistant Examiner*—Sing P Chan
(74) *Attorney, Agent, or Firm*—Holme Roberts & Owen LLP

(57) ABSTRACT

A three-dimensional removable wall adornment system is provided that comprises an inflexible three-dimensional wall adornment and a unitary block of adhesive paste. The adornment has one or more mounting surfaces for mounting on a wall and a raised three-dimensional molded surface for viewing. The adhesive paste has an adhesive strength such that, when divided into smaller portions, the adhesive paste is suitable for securely affixing the mounting surface of the wall adornment to a vertical surface on a structure. The adhesive paste can be repeatedly attached and removed from both the vertical surface of the structure and the wall adornment without damaging the vertical surface or the wall adornment while maintaining sufficient adhesive strength to securely affix the wall adornment to the vertical surface.

16 Claims, 3 Drawing Sheets

THREE-DIMENSIONAL RECONFIGURABLE WALL ADORNMENT SYSTEM

CROSS REFERENCE TO RELATED APPLICATIONS

The present application is a divisional of application Ser. No. 10/361,472, filed Feb. 10, 2003, entitled "Three-Dimensional Reconfigurable Wall Adornment System," now abandoned which claims the benefit of U.S. Provisional Application No. 60/361,452, filed Mar. 4, 2002, entitled "Three-Dimensional Reconfigurable Wall Adornment System," both of which applications are incorporated herein by reference in their entirety.

BACKGROUND OF THE INVENTION

1. The Field of the Invention

The present invention relates generally to wall adornments. In particular, the present invention relates to devices and systems for affixing re-configurable three-dimensional adornments to vertical surfaces such as walls.

2. The Relevant Technology

Traditional two-dimensional wall decorations, such as paint and wallpaper, are extremely popular for enhancing the decorative aspects of a room. Nevertheless, two-dimensional wall decorations are limited in that they are time-consuming and cumbersome to apply and are difficult to remove. In order to change the decor of a painted room the walls must optionally be stripped and repainted. Wallpapered rooms must also be stripped in a very time consuming process. Therefore, walls decorated with an emphasis on paint and/or wallpaper are non-compatible with the desire to easily and quickly alter a room's decor.

Typical approaches to quickly and frequently altering a room's decor involve using decorations such as pictures, wall-hangings, hanging ornaments, and the like. Such decorations are typically two-dimensional are usually relatively heavy and therefore require the use of permanent-fasteners, such as nails, screws, pushpins, and the like. Because these fasteners are permanent they damage the underlying walls, typically leaving holes once removed. In order to rearrange the decorations either the holes must be patched or the new decorations must be positioned to cover the holes created for the previous decorations. Thus, even conventional removable decorations are incompatible with the desire to frequently reconfigure or redecorate a room.

Another type of decorating system involves the use of thin appliqués that are mounted onto a wall. These appliqués may be temporary or permanent. If permanent, they are glued in place and are difficult to cleanly remove as they leave a thin, tacky residue which gathers dust. Removable appliqués lose their adhesive capability over time and are expensive to replace.

In order to create an illusion of depth, some two-dimensional wall ornaments are designed to be stacked to form a sort of three-dimensional appearance. These sometimes involve smaller component pieces that are layered onto larger background components. For example, U.S. Pat. No. 5,491,006 relates to a wall decorating system for using a releasably mounted wall ornament. The wall decorating system uses multi-color images printed on a relatively thick and rigid medium such as foam board that is attached to a wall or similar planer surface with a reusable adhesive. The wall ornament is a planar substrate of uniform thickness that creates a three-dimensional illusion by raising the laminar substrate above the wall surface. Nevertheless, any three-dimensional effect created by elevating a planar surface over another planar surface has limited three-dimensional effects and in fact loses any such effects when viewed from the side.

In some instances, three-dimensional wall ornaments have been utilized to decorate a generally planar wall surface. Typically, the three-dimensional wall ornaments have been made of wood, plaster, a vacuum-formed plastic material, fiberglass, and the like. These prior materials used in making three-dimensional wall ornaments have several drawbacks, however. The heavy weight of wood, plaster and other similar materials require substantial mounting devices, such as nails, screws, and the like. These heavy devices can also endanger an infant or child if the ornament drops from the wall. Casting resins, vacuum-formed plastic, and fiberglass, on the other hand, can be lightweight but usually are brittle, toxic, or sharp when cut, broken, or torn. Additionally, the manufacturing tolerance stack-ups involved in making objects via vacuum forming or glassing can detract from the aesthetics. The vacuum-formed product also has a reduced aesthetic value due to its translucent or transparent appearance and the required flashing which results.

U.S. Pat. No. 6,132,821 relates to a soft pliable wall adornment. The adornment has a flat back portion with removable mounting elements, such as double-sided adhesives, for attachment to a wall. The front portion has a raised relief to create a three-dimensional visual quality. The adornment is soft and pliable so that it is suitable for use in a room with infants, toddlers, and small children. However, the mounting element, though removable, is incompatible with repeated removal and reuse and is not designed to support significant weights for extended periods of time.

Additionally, conventional methods of attaching or adhering decorations to a wall have disadvantages that prevent their use for frequently re-configuring the wall decorations. As mentioned hereinabove, nails, screws, and tacks permanently damage walls while glue, tape, conventional sticky paste, and other adhesives are either too strong and damage the wall, too weak and do not support the decoration, or leave an undesirable and unappealing residue on the wall.

Although easily removed and lacking significant residue when removed, rubber cement has proven inadequate for repeatedly mounting wall decorations for numerous reasons. For example, if a decoration of any substantive weight is mounted with rubber cement the decoration must be held in place until the rubber cement dries, a burdensome process. In addition, each movement of the wall decoration requires a new portion of rubber cement and another episode of holding the wall decoration in place until the decoration dries.

BRIEF SUMMARY OF THE INVENTION

The present invention relates generally to a three-dimensional removable wall adornment system that comprises one or more inflexible three-dimensional wall adornments and adhesive paste. The adhesive paste can be selectively divided into smaller portions and used to adhere the adornment to a vertical surface such as an interior or exterior wall of a house.

According to one embodiment of the invention, the adhesive paste has an adhesive strength from about 0.6 kg $f/cm^2$ to about 2.0 kg $f/cm^2$ so that it is capable of securely affixing the wall adornment to a surface on a structure, such as a vertical surface, and may be divided into smaller portions for that purpose. The adhesive paste portions can be repeatedly attached and removed from both the surface of the structure and the wall adornment without damaging the surface of the structure or the wall adornment while maintaining sufficient adhesive strength to securely affix the wall adornment to the surface of the structure.

Optional components of the system according to the invention include one or more portions of a coloring material, such as paint, for decorating the adornment and/or decorative elements selected from the group consisting of wallpaper and wall paint that are selected to coordinate with the wall adornment in a decorative scheme covering the wall.

According to one embodiment the wall adornment is a molded lightweight polyurethane article having a hardness such that it forms a rigid article without being brittle. Such a material can be effectively formed in an appropriate mold and also easily cut or sawed to a desired length or height to fit with in a desired space. For example, it may be desired to cut one side of an adornment so that the adornment mounts on a first wall surface and abuts a second wall surface that is perpendicular to the first wall surface.

The adornments can be molded not only for mounting on a single wall, but can also be sculpted and molded to mount on a plurality of surfaces, such as at the interior intersection of two vertical walls of a room or in an upper corner of a room at the intersection of two vertical walls and a ceiling. Alternatively, the adornments can be configured for mounting on the exterior of two or more surfaces, such as along the edge of a post or at the top corner of a post. Such adornments will have a plurality of mounting surfaces that are configured to correspond to a plurality of other surfaces on which the adornment is to be mounted.

In addition to interior walls the wall adornment system can also be used to adhere a wall adornment to the exterior of a home that is intermittently exposed to wet or freezing conditions. For example, holiday decorations related to Thanksgiving or Halloween could be adhered to a door or house siding such as brick, aluminum, or stucco during the relevant holiday season.

According to the invention, it has been surprisingly determined that the adhesive paste portions gain adhesive strength through the following procedure. First, the adhesive paste portion is kneaded before placement on the adornment. Each portion is formed into a spherical shape so that when the adornment is pressed against the wall surface the adhesive paste portion is spread and flattened between the wall surface and the adornment. This procedure maximizes the surface area contact between the paste and the adornment and between the paste and the wall surface and also enhances the adhesive force of the paste.

According to another embodiment of the invention, the inflexible three-dimensional wall adornment includes an opening that can hold an object, such as photos, pictures, lights, audio devices, or other objects. The opening may extend partially or entirely through the adornment.

These and other features of the present invention will become more fully apparent from the following description and appended claims, or may be learned by the practice of the invention as set forth hereinafter.

These and other objects and features of the present invention will become more fully apparent from the following description and appended claims, or may be learned by the practice of the invention as set forth hereinafter.

BRIEF DESCRIPTION OF THE DRAWINGS

In order to more fully understand the manner in which the above-recited and other advantages and objects of the invention are obtained, a more particular description of the invention will be rendered by reference to specific embodiments thereof which are illustrated in the appended drawings. Understanding that these drawings depict only typical embodiments of the invention and are not therefore to be considered as limiting of its scope, the invention will be described and explained with additional specificity and detail through the use of accompanying drawings in which.

DETAILED DESCRIPTION OF THE PREFERRED EMBODIMENTS

The present invention relates to a three-dimensional removable wall adornment system and method. The system includes one or more inflexible three-dimensional wall adornments and adhesive paste that can be selectively divided into smaller portions. One or more of the smaller adhesive paste portions can be used to adhere the adornment to a vertical surface, such as a wall. Other optional components include paint, wallpaper, and the like to assist in creating an overall decorative impression.

Figure 1:
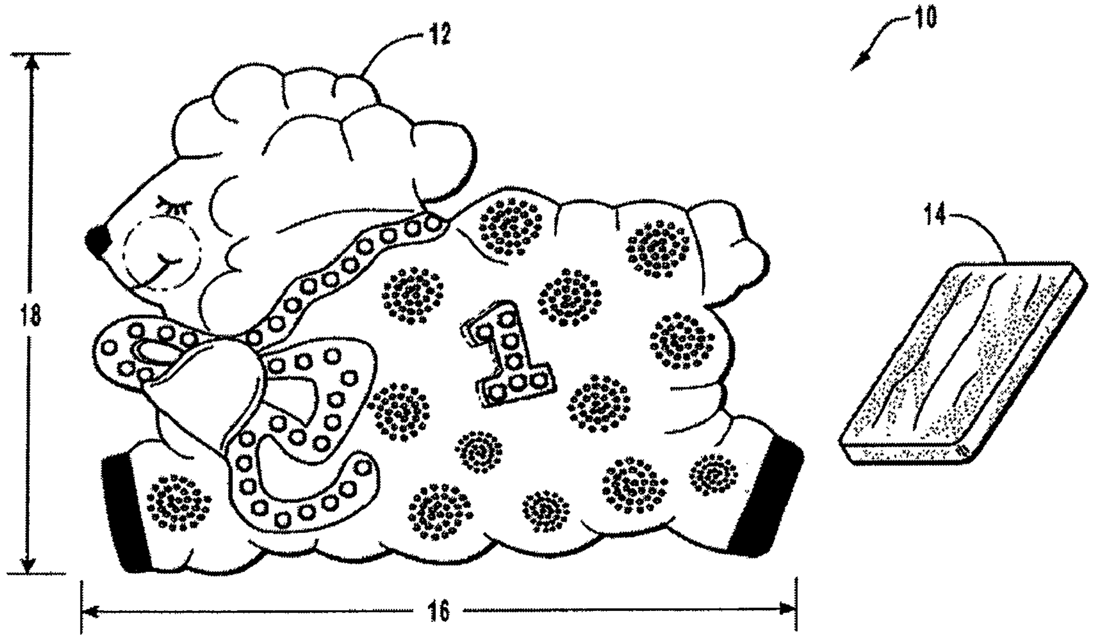
FIG. 1 is a preferred system according to one embodiment of the invention.

Referring now to the drawings, FIG. 1 depicts a three-dimensional wall adornment system 10 according to the invention. The system includes adornment 12 and unitary block of adhesive paste 14. Adornment 12 and unitary block of adhesive paste 14 will be described in further detail hereinbelow.

Figure 2:
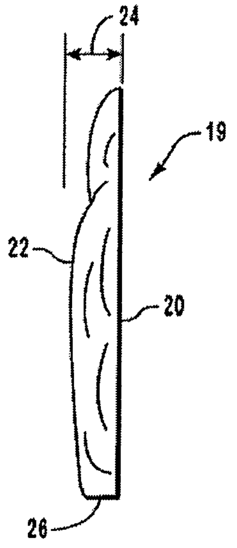
FIG. 2 is a perspective view of an adornment according to one embodiment of the invention.

As illustrated in FIG. 1, adornment 12 has a length 16 and a height 18. It will be understood that the following recited dimensions are illustrative of the limitations of the current materials and current manufacturing and installation techniques, and that both larger and smaller dimensions are also encompassed by the present invention and are not intended to be excluded by the present discussion. Therefore, according to one aspect of the invention, the length 16 can range from 1 inches up to about 24 inches and the height can range from 1 inches up to about 12 inches. As illustrated in FIG. 2, adornment 12 also has a thickness 24, which according to one aspect of the invention can range from about 0.5 inches to about 2 inches. These dimensions correspond generally to the maximum dimensions that individual adornments can be formed in from currently used materials and still have a reliable strength and sufficiently low weight for adhesive mounting. Thus, an adornment of the invention depicting a sheep may have dimensions of approximately 4 inches in height by 6 inches in length by 0.75 inches in thickness whereas one depicting a collage of sports paraphernalia may comprise the entire maximum of 14 in length inches by 6 inches in height by 2 inches in thickness.

Referring now to FIG. 2, depicted is a side view of adornment 19 according to one embodiment of the invention. The adornment 19 has a planar mounting surface 20 and a sculpted low relief surface 22 opposite the mounting surface 20. The mounting surface 20 is substantially planar so that it can easily be positioned adjacent a surface on which the adornment is to be mounted, such as a wall.

The low relief surface 22 is a raised three-dimensional molded surface that provides the desired decor. A low relief is generally defined as a sculptural relief that projects very little from the background. Thus, a sculpted sheep in low relief projects less than an accurately proportioned sculpted sheep. The depth of the relief on the adornment may extend from zero inches, as in the case of an opening, up to the full two inches. The typical change in three-dimensional relief between contiguous portions of the three-dimensional surface, however, will typically be slight.

In comparison to full-relief sculpture, the adornment 12 has the advantages of being lighter, having a better weight distribution, being more easily viewed from all angles, not extending a great distance into the room, reducing grasping surfaces for small children, and avoiding harsh shadows. Additionally, for the purposes of disclosing the features and advantages of low relief sculpture for wall adornments, U.S. Pat. No. 6,132,821 to Garr is herein incorporated by reference.

According to one preferred aspect of the invention, adornment 12 comprises a molded lightweight polyurethane article with a predetermined hardness (a characteristic of a solid enabling it to resist deformation by cutting, grinding, scratching, or impact by another substance). According to one embodiment of the invention it has been determined that an article with too high a hardness is too pliable while an article with too low a hardness is too brittle. Accordingly, according to one embodiment of the invention the polyurethane preferably has a hardness (as measured by a type A durometer) of from about 70 to about 100, or from about 75 to about 95, or from about 80 to about 85. Other materials that are similarly lightweight with a comparable hardness are also suitable.

Similarly, accordingly to another embodiment of the invention adornment 12 also has one or more predetermined densities. Preferably, adornment 12 has an outer layer having a first density and an inner layer having a density less than one half the density of the outer layer. For example, according to one embodiment the outer layer has a density of from about 140 to about 170 kg/m$^3$, more preferably from about 150 to about 160 kg/m$^3$, and the inner layer has a density from about 65 to about 80 kg/m$^3$. This distinction in layer density allows adornment 12 to have a higher hardness (measured at the outer layer) and strength while minimizing the weight thereof. Thus, a device can be larger and harder than otherwise would be possible while still being light enough to be securely adhered to a vertical wall surface.

Advantageously, the relative hardness and constitution of polyurethane foam enable it to be effectively formed in an appropriate mold and later cut or sawed a desired length or height to fit with in a desired space. As depicted in FIG. 2, for example, it may be desired to cut one end of an adornment so that it has a side surface 26 configured to abut a another surface on a structure, such as a wall. A conventional miter saw is suitable for accurately cutting the polyurethane foam to size.

Figure 3:
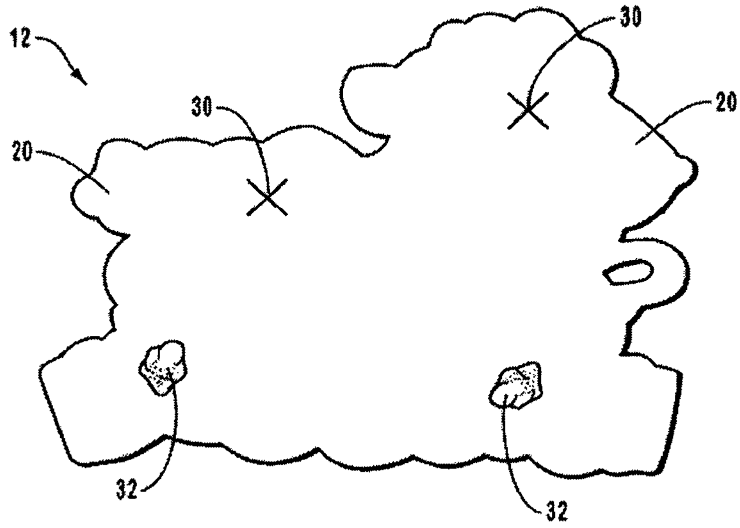
FIG. 3 is another view of an adornment according to one embodiment of the invention.

Referring now to FIG. 3, illustrated is the mounting surface 20 of adornment 12. Also depicted are markings 30 and adhesive portions 32. According to one embodiment of the invention, markings 30 are located on mounting surface 20 as a guide for indicating the location where adhesive portions are to be located. Such markings can include, for example, a letter "X," a circle, an arrow, words, or other useful markings. According to yet another embodiment markings are not included on the mounting surface. In this case, either textual instructions or a map can be included with the systems to either show or describe how the adhesive portions are to be located.

Figure 4:
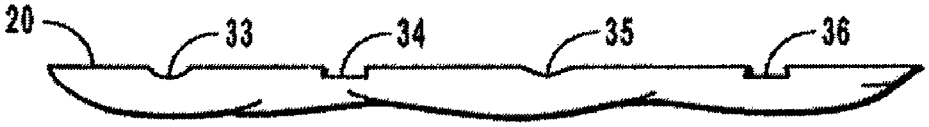
FIG. 4 is a further view of an adornment according to one embodiment of the invention.

Referring now to FIG. 4, the markings on mounting surface 20 of adornment 12 may comprise indentations in a variety of shapes, including by way of example only, a C-shaped impression or channel 33, a rectangular groove 34, a V-shaped groove 35, and a dovetail cavity 36 having a wider base than top. The dovetail shape is particularly advantageous in that it forms a locking cavity that can securely hold adhesive paste within as the adornment is removed from a surface. Thus, the adhesive paste will adhere to the adornment rather than the surface to which it was affixed. The indentations can be circular, rectangular, patterned in the shape of an "X or an arrow, or formed in other useful patterns or shapes. The indentations 33-36 are made possible by the advantageous rigid polyurethane materials disclosed herein and can be formed by molding, stamping, cutting, laser-etching, or other methods known in the art.

The indentations 33-36 are particularly advantageous in that they provide increased surface area for receiving the adhesive portions, thereby increasing the overall adhesive strength of the system. The indentations 33-36 also provide mechanical strength to the adhesive systems in that the a part of an adhesive portion will be seated in the indentation and thereby supported by the indentation.

Figure 5:
FIG. 5 is yet another view of an adornment according to one embodiment of the invention.

In addition, FIG. 5 illustrates that mounting surface 20 may comprise a roughened 37 or porous 38 surface. The roughened surface can be intentional formed by a variety of methods, including stamping, cutting, molding, and the like. The roughened or porous surface provides increased surface area for adhering to adhesive portions and adds mechanical strength to assist in supporting the adornment while hanging.

Figure 6:
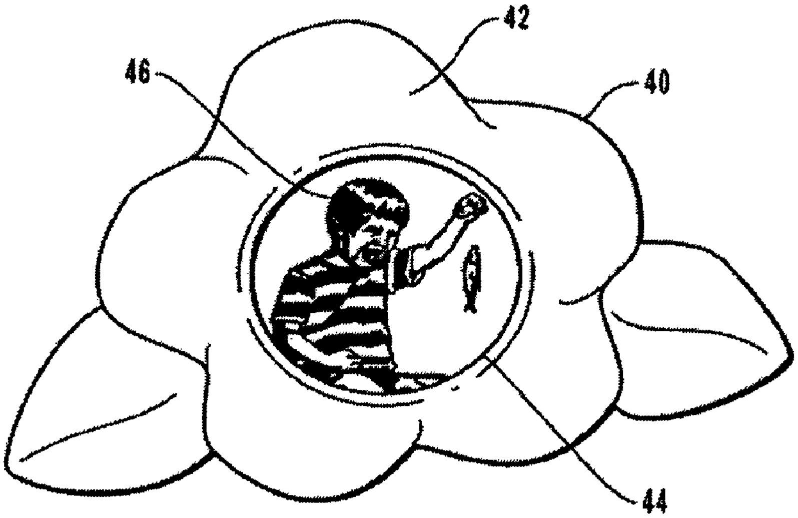
FIG. 6 is an adornment according to another embodiment of the invention.

Referring now to FIG. 6, one embodiment of the invention comprises a frame adornment 40 that has a raised portion 42 with an opening 44 therein. Opening 44 may extend entirely or partially through adornment 40 so that an object, such as a photograph 46, may be placed within the opening 44 of the adornment 40. The opening 44 may be covered with a glass cover or any other suitable translucent or transparent material to protect the picture. If opening 44 extends entirely though the adornment then suitable backing may also be provided for support of the picture.

In addition to a photograph 46, opening 44 can house a variety of objects. A non-exclusive list includes toy figures, drawings, medals, and the like. Functional members can also be included, such as lights and/or audio devices. Examples of audio devices include, for example, speakers, voice boxes, music boxes, sound boxes, and the like. Controlling devices for the functional members can be remotely mounted or included with the adornment. Additionally, the lights and/or audio devices can also be concealed, at least partially, within the molded adornment.

Figure 7A:
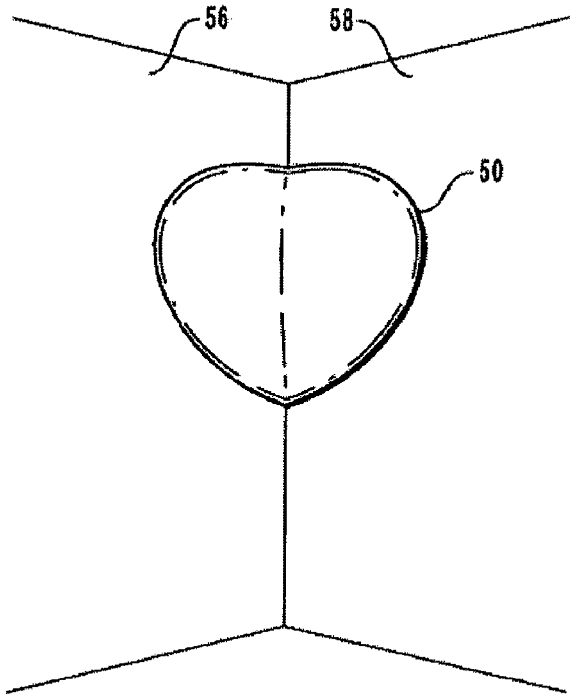
FIG. 7*a* is another adornment according to yet another embodiment of the invention.
Figure 7B:
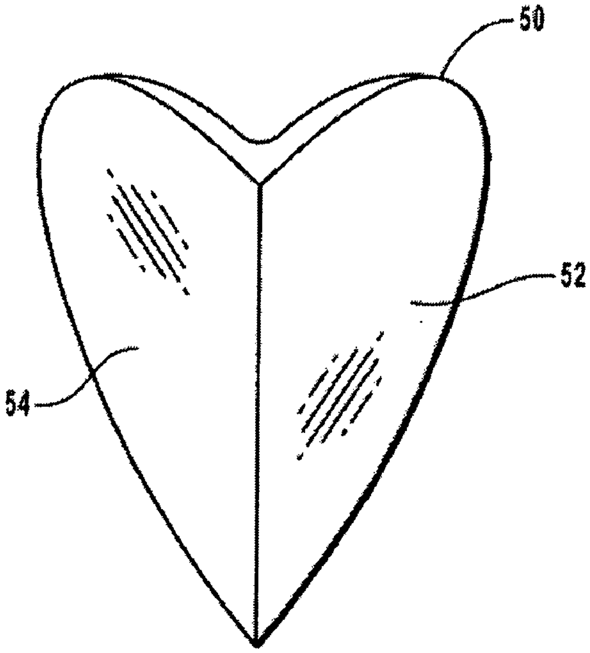
FIG. 7*b* is a perspective view of another adornment according to the invention.

FIGS. 7*a* and 7*b* illustrates a further embodiment of the invention wherein the adornment 50 has a mounting surface that comprises two adjacent surfaces 52, 54. According to this embodiment of the invention the mounting surface comprises multiple non-parallel surfaces that intersect at an angle greater than zero. For example, the mounting surface may comprise a two hundred and seventy degree bend so that two non-parallel surfaces are present to help mount the adornment 50 at the intersect between two perpendicular walls 56, 58. Alternatively, the mounting surface can comprise a ninety degree angle between them so that the adornment can be mounted on a post, pillar, dresser, or any other acceptable edge surface.

Additionally, the adornment could have three or more appropriately positioned mounting surfaces for placement in a ceiling corner of a room or outer corner of a rectangular corner, for example.

While the illustrated embodiment is of a sheep, one of ordinary skill in the art will readily recognize that the embodiments of the inventions are not limited to this embodiment. The range of sculptures that can be depicted is limited only by the imagination of the sculptor. Other representative embodiments may comprise, for example, dolls, sports logos, balls, animals, plants, inanimate objects, and the like. According to yet another aspect of the invention the adornment may comprise non-representative sculpture, such as crown molding, chair rail molding, stone, brick, and the like.

Additionally, the adornment can form a portion of a larger decor. For example, several adornments can be used to form a scene such as sheep jumping over a fence. Also, multiple picture frame adornments can be combined to create a reconfigurable photo wall.

Referring again to FIG. 3, adhesive paste portions 32 are adhesive paste that preferably have been preferably separated from a unitary block of adhesive paste 14, separated into portions, and applied in the appropriate locations on the mounting surface 20 of the adornment.

Unitary block of adhesive paste 14 can be supplied without markings, with imprinted markings indicating appropriate divisions of the paste, or with deep indentations that enable easy separation of the unitary block of adhesive paste 14 into one or more appropriately sized portions for adhering adornment 12 to a wall.

The basic requirements for an adhesive paste according to the invention are that the paste can be repeatedly attached and removed from both the vertical surface of a structure and a wall adornment to which it is attached without damaging the vertical surface or the wall adornment while maintaining sufficient adhesive strength to securely affix the wall adornment to the vertical surface of the structure.

One preferred adhesive composition according to the invention comprises an adhesive paste composed of polyisobutylene, $CaCO_3$, and clay. Such an adhesive paste has the advantage of being pliable while maintaining a shape "memory" that allows it to maintain a shape and avoid sagging or deforming over time. Another adhesive composition according to the invention comprises an adhesive paste composed of titanium dioxide, butyl rubber, and polybutene H-300. Of course, other adhesive pastes that meet the requirements of the invention are also encompassed within the scope of the invention.

One aspect of the invention is that the adhesive preferably have an adhesive strength from about 0.6 kg $f/cm^2$ to about 2.0 kg $f/cm^2$, or about 1.2 kg $f/cm^2$ to about 2.0 kg $f/cm^2$ or alternatively about 1.2 kg $f/cm^2$ to about 1.6 kg $f/cm^2$. The adhesive force represents the weight of the object at which the adhesive fails to maintain the object. In this case, the adhesive strength is measured by adhering an object with a weight in kilograms onto a vertical surface with 1 square centimeter of the adhesive. Hence, an adhesive that supports objects up to but not including 2.0 kg would have an adhesive strength of 2.0 kg $f/cm^2$.

According to another aspect of the invention, the following process maximizes the effective adhesive strength of the adhesive paste without creating such an adhesive force so as to damage the underlying surface. First, as mentioned hereinabove, a unitary block of adhesive paste may be divided into one or more portions, preferably sized to have diameters of from about one half centimeter to about one and one half centimeter. The preferred size may depend on the weight of the adornment and the number of adhesive potions used. Each adhesive paste portion is then kneaded for a few seconds by pulling, twisting, and/or otherwise manipulating the adhesive paste. The adhesive paste portion is then rolled into a roughly spherical shape and placed on the adornment.

One or more adhesive paste portions are preferably placed on the mounting surface of the adornment in spacings of about 1 to 3 inches, preferably about 2 inches. According to one preferred aspect of the invention the portions are located in a repeating geometric pattern, for example, a rectangular grid.

Next, the adornment is pressed against the vertical surface, thereby contacting the adhesive paste portion with the vertical surface and spreading and flattening the adhesive paste portion between the vertical surface and the adornment. The combination of first kneading the adhesive paste and then pressing the adornment so as to spread and flatten the adhesive paste portion between the vertical surface and the adornment enhances the adhesive force of the paste.

According to one embodiment of the invention, the creation and fabrication of the adornments is as follows. First, an artist optionally creates a two-dimensional illustration of the image to be embodied in the adornment. Next, either from the illustration or from a new design a sculptor creates a low relief one-sided clay sculpture depicting the desired image. While the sculpted surface is typically only the three-dimensional surface, it also contemplated that one or more mounting surfaces can also be included in the sculpted surface.

A sample mold is made from the clay sculpture according to methods known to those skilled in the art. From this mold it is possible to create a number of adornments. Nevertheless, it is preferable to create a multi-cavity mold to enable mass production. For example, such a multi-cavity mold may enable the simultaneous formation of five adornments. Each mold is preferably a steel clam-shell shaped mold that encapsulates the cavity in which the adornment is formed. Optionally, a layer of silicone can be placed into the mold cavity to facilitate removal of the adornment after it has hardened.

In production, a non-solid polyurethane foam is injected into the cavity in each mold. The foam expands to fill the entirety of the mold cavity, forming a more dense layer at the outer surface and a lower density in an inner layer. The greater the amount of foam injected into the cavity the higher the adornment density and hardness.

Optionally, three-dimensional markings, such as markings 30, copyright notices, brand indications, and the like can be formed on the portion of the foam polyurethane that is adjacent the removed excess before it dries. This can be performed in the molding process, or in a variety of other ways, such as a stamp. Alternatively, after the polyurethane foam dries two-dimensional markings can be painted or otherwise formed on the mounting surface.

The molded sculpture may be painted during manufacture using any suitable method, such as, but not limited to, masking and spraying or hand painting. The masking can be performed utilizing electroplated nickel impressions of the adornment which have portions removed that represent each color. Thus, a separate mask is typically utilized for each color. Of course, other conventional painting methods can also be used.

Another configuration would allow purchasers to paint the wall adornment through a paint-it-yourself type of kit. Thus, the systems of the invention can include one or more coloring materials, such as paint. Of course, the system could also include other decorative features for optional use by a purchaser, such as stickers, laminates, and the like. Finally, the wall adornment could be painted or impregnated to allow the wall adornment to glow in the dark or have a desired base color.

According to one aspect of the invention, a plurality of adornments can be positioned with a desired relationship to each other to create an overall decorative effect. For example, the adornments may comprise a plurality of sheep and a fence. In this case a user could position the sheep so that they are depicted as jumping over the fence. Alternatively the adornments may comprise objects within a theme, such as a variety of sports equipment or plants in a garden.

Additionally, painted images or wallpaper having images thereon, such as a fence and/or illustrations of a meadow, can be used. In this scenario the sheep can be depicted in various positions with relation to the illustrations in the paint or wallpaper. The three-dimensional relief of the adornments adds a decorative impression that is customizable and not obtainable through two-dimensional wallpaper or other laminar wall decorations.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method of mounting a three-dimensional adornment to a vertical surface, the method comprising:

providing a unitary block of pliable shape memory adhesive paste, the adhesive paste having an adhesive strength of from about 0.6 kg f/cm$^2$ to about 2.0 kg f/cm$^2$;

providing a deformation resistant wall adornment having a planar first surface and an opposing raised three dimensional second surface, the first surface having at least one indentation formed therein for receiving a first portion of the adhesive paste;

kneading a portion of the adhesive paste and placing the kneaded portion of the adhesive paste on the indentation; and pressing the deformation resistant wall adornment against a vertical surface, thereby contacting the adhesive paste portion with the vertical surface and spreading and flattening the adhesive paste portion between the vertical surface and the first surface and pressing the adhesive paste portion into the indentation.

2. The method of claim 1, wherein the deformation resistant wall adornment comprises a deformation resistant molded polyurethane article.

3. The method of claim 2, wherein the deformation resistant molded polyurethane article has a hardness of from about 70 to about 100 as measured by a type A durometer.

4. The method of claim 2, wherein the deformation resistant molded polyurethane article comprises a polyurethane foam with a hardness of from about 80 to about 85 as measured by a type A durometer.

5. The method of claim 1, wherein the at least one indentation comprises an indentation selected from a C-shaped channel, a V-shaped channel, and a rectangular channel.

6. The method of claim 1, wherein the at least one indentation comprises at least three indentations that are spaced at intervals of from about 1 inch to about 3 inches.

7. The method of claim 1, wherein the adhesive paste comprises titanium dioxide, butyl rubber, and polybutene.

8. The method of claim 1, wherein pressing the adornment against a vertical surface comprises pressing the adornment against a wallpapered surface.

9. The method of claim 1, wherein pressing the adornment against a vertical surface comprises pressing the adornment against a painted surface.

10. The method of claim 1, wherein pressing the adornment against a vertical surface comprises pressing the adornment against an exterior of a home that is intermittently exposed to at least one of wet and freezing conditions.

11. The method of claim 1, wherein the adornment has a length of from about 1 inch to about 24 inches, a height of from about 1 inch to about 12 inches, and a thickness of from about 0.125 inches to about two inches.

12. The method of claim 1, wherein the first surface and the second surface of the adornment each have a density of from about 140 kg/m$^3$ to about 170 kg/m$^3$, the adornment further comprising an interior portion between the first surface and the second surface, the interior portion having a density of from about 65 kg/m$^3$ to about 80 kg/m$^3$.

13. The method of claim 1, wherein the adhesive paste is divided into one or more adhesive paste portions, each of the one or more adhesive paste portions gaining adhesive strength by performing the method comprising:

dividing the unitary block of adhesive paste into a portion from about one half centimeter to about one and one half centimeters in diameter;

kneading the adhesive paste portion;

placing the adhesive paste portion on the first surface of the adornment in a roughly spherical shape;

pressing the adornment against the vertical surface, thereby contacting the adhesive paste portion with the vertical surface and spreading and flattening the adhesive paste portion between the vertical surface and the adornment.

14. The method of claim 1, wherein the unitary block of adhesive paste has a volume sufficient to be divided into a plurality of separate portions, each portion having a diameter of at least about one half centimeter.

15. A method of removably mounting a three-dimensional adornment to a vertical surface, the method comprising:

providing a unitary block of pliable shape memory adhesive paste, the adhesive paste having an adhesive strength of from about 0.6 kg f/cm$^2$ to about 2.0 kg f/cm$^2$;

forming a plurality of portions of adhesive paste from the unitary block of pliable shape memory adhesive paste;

providing a deformation resistant wall adornment having a planar first surface and an opposing raised three dimensional second surface, the first surface having a first indentation formed therein for receiving a portion of the adhesive paste and a second indentation formed therein for receiving a portion of the adhesive paste;

forming a first portion of the adhesive paste into a generally spherical shape and placing the first portion on the first indentation;

forming a second portion of the adhesive paste into a generally spherical shape and placing the second portion on the second indentation; and pressing the deformation resistant adornment towards the vertical surface to thereby contact the first and second portions of adhesive paste with the vertical surface, force the adhesive paste into the indentations, and spread and flatten the adhesive paste between the vertical surface and the planar first surface.

16. The method of claim 15, further comprising:

removing the adornment and the first and second portions of adhesive paste from the vertical surface;

reforming the first portion of adhesive paste into a generally spherical shape and, if necessary, repositioning the first portion on the first indentation;

reforming the second portion of adhesive paste into a generally spherical shape and, if necessary, repositioning the second portion on the second indentation; and pressing the deformation resistant adornment towards a new location on the vertical surface to thereby contact the first and second portions of adhesive paste with the vertical surface and spread and flatten the adhesive paste between the vertical surface, the first and second indentations, and the planar first surface.

* * * * *